United States Patent [19]
Gao et al.

[11] Patent Number: 5,972,055
[45] Date of Patent: Oct. 26, 1999

[54] BINARY SOLVENT METHOD FOR BATTERY

[75] Inventors: Feng Gao, Henderson; Jeremy Barker; Porter H. Mitchell, both of Las Vegas; Jeffrey Swoyer, Henderson; Arnie Stux, Las Vegas, all of Nev.

[73] Assignee: Valence Technology, Inc., Henderson, Nev.

[21] Appl. No.: 08/680,421

[22] Filed: Jul. 15, 1996

[51] Int. Cl.⁶ .................................................. H01M 10/38
[52] U.S. Cl. ......................................... 29/623.5; 429/192
[58] Field of Search ............................. 29/623.5; 429/192

[56] References Cited

U.S. PATENT DOCUMENTS

| | | | |
|---|---|---|---|
| 5,089,027 | 2/1992 | Rossoll et al. | 29/623.5 X |
| 5,540,741 | 7/1996 | Gozdz et al. | 429/192 X |
| 5,552,239 | 9/1996 | Gozdz et al. | 429/192 X |

*Primary Examiner*—John S. Maples
*Attorney, Agent, or Firm*—Karen S. Perkins

[57] ABSTRACT

The subject invention discloses a novel method of providing a binary electrolyte-solvent solution in a solid battery system. A first component of this binary electrolyte solvent system is provided by a material which acts as a plasticizer in the formation of a solid polymeric matrix (separator), composite cathode and/or composite anode, and which also acts as an electrolyte solvent in the completed electrochemical cell. The second component of the binary electrolyte solvent system is an electrolyte solvent, which generally carries the electrolyte salt into the electrolytic cell precursor. The first and second components of the binary electrolyte solvent system mix within the electrolytic cell, dispersing the electrolyte salt throughout the binary electrolyte solvent system. The addition of the electrolyte salt to the electrolytic cell precursor acts to activate the cell precursor, and to form a functional electrolytic cell or battery system.

16 Claims, 8 Drawing Sheets

5,972,055

BINARY SOLVENT METHOD FOR BATTERY

TECHNICAL FIELD

This invention relates generally to electrolytic cells comprising one or more polymeric composition electrode and/or polymeric electrolyte film separator, and to a method of economically making such cells. More particularly, this invention relates to a binary solvent system for electrochemical cells having laminated electrode components which obviates the need for an extraction or displacement of plasticizer in the formation of the battery.

BACKGROUND OF THE INVENTION

Electrolytic cells containing an anode, a cathode, and a solvent-containing electrolyte are known in the art. One trend in battery technology is toward nonaqueous lithium electrochemical cells. Such cells typically included an anode of metallic lithium, a lithium electrolyte prepared from a lithium salt dissolved in one or more organic solvents, and a cathode of an electrochemical active material, typically a chalcogenide of a transition metal. More recently, insertion compounds have replaced metallic lithium in the anode.

These solid, secondary battery typically comprises several solid, secondary electrolytic cells in which the current from each of the cells is accumulated by a conventional current collector so that the total current generated by the battery is roughly the sum of the current generated from each of the individual electrolytic cells employed in the battery.

During discharge, lithium ions from the anode pass through the liquid electrolyte to the electrochemically active material of the cathode, where the ions are taken up with the simultaneous release of electrical energy. During charging, the flow of ions is reversed so that lithium ions pass from the electrochemically active cathode material through the electrolyte and are plated back onto the lithium anode.

U.S. Pat. No. 5,456,000, which is incorporated by reference in its entirety, discloses the formation of electrolytic cell electrodes and electrolyte film/separator elements. The electrodes and electrolyte film/separator elements use a combination of a poly(vinylidene fluoride) copolymer matrix and a compatible organic solvent plasticizer to provide battery component layers, each in the form of a flexible, self-supporting film.

An electrolytic cell precursor, such as a rechargeable battery cell precursor, is constructed by means of the lamination of electrode and electrolyte film cell elements which are individually prepared. Each of the electrodes and the electrolyte film/separator is formed individually, for example by coating, extrusion, or otherwise, from compositions including the copolymer materials and a plasticizer. The materials are then laminated, as shown in FIG. 1.

In the construction of a lithium-ion battery, for example, a copper grid may comprise the anodic current collector 110. An anode (negative electrode) membrane 112 is formed by providing an anodic material dispersed in a copolymer matrix. For example, the anodic material and the copolymer matrix can be provided in a carrier liquid, which is then volatilized to provide the dried anode membrane 112. The anode membrane 112 is positioned adjacent the anodic current collector 110.

An electrolyte film/separator membrane 114 is formed as a sheet of a copolymeric matrix solution and a plasticizer solvent. The electrolyte film/separator membrane 114 is placed adjacent the anode membrane 112.

A cathode (positive electrode) membrane 116 is similarly formed by providing a cathodic material dispersed in a copolymer matrix. For example, the cathodic material and the copolymer matrix can be provided in a carrier liquid, which is then volatilized to provide the dried cathode membrane 116. The cathode membrane 116 is then overlaid upon the electrolyte film/separator membrane layer 114, and a cathodic current collector 118 is laid upon the cathode membrane.

The assembly is then heated under pressure to provide heat-fused bonding between the plasticized copolymer matrix components and the collector grids. A unitary flexible battery precursor structure is thus produced.

An extraction process of the prior art is graphically represented in FIGS. 2a–2c. During processing of the battery precursor 220, a large quantity of a homogeneously distributed compatible organic solvent plasticizer 222 is present in the solid polymeric matrix, as represented in FIG. 2a. Prior to activation of the battery, however, the organic solvent 222 is removed, as represented in FIG. 2b. This is generally accomplished using an extracting solvent (not shown) such as diethyl ether or hexane, which selectively extracts the plasticizer without significantly affecting the copolymer matrix. This produces a "dry" battery precursor 224 substantially free of plasticizer and which does not include any electrolyte solvent or salt. As represented in FIG. 2c, an electrolyte solvent and electrolyte salt solution 226 is imbibed into the "dry" battery copolymer membrane structure to yield a functional battery system 228.

This prior art extraction requires the use of hazardous chemicals, such as ether or hexane, to produce the "dry" electrolytic cell precursor, which is then activated by introduction of electrolyte solution (electrolyte solvent and electrolyte salt) to form the electrolytic cell.

An alternate prior art method of forming an electrolytic cell, i.e., a displacement method, is graphically represented in FIGS. 3a and 3b. As represented in FIG. 3a, a large quantity of a homogeneously distributed plasticizer 322 is present in the solid polymer matrix of the battery precursor 320. Rather than extracting this plasticizer 322, as discussed above, the plasticizer is instead displaced by an electrolyte solution 326. Displacement of the plasticizer 322 by the electrolyte solution 326 is stated to be virtually complete, as represented in FIG. 3b.

However, it has been found that complete removal of the plasticizer is not obtained using either the extraction or the displacement methods of the prior art. In a preferred embodiment of the prior art, using tetrahydrofuran (THF) as the plasticizer, it is necessary to completely remove all traces of the plasticizer. THF has relatively poor electrochemical stability, such that the presence of even minor amounts of THF or similar electrochemically unstable components can "poison" the battery, causing poor cycling of the battery and a shortened battery life.

In view of the above shortcomings associated with the prior art, there is a need for solid state electrochemical devices that are capable of providing improved manufacturing parameters, and improved battery performance.

SUMMARY OF THE INVENTION

The prior art methods require that plasticizer used to form a solid polymeric matrix be removed, either by extraction or by displacement. It has been discovered that a dual-purpose plasticizer/electrolyte can be used, negating the need for plasticizer removal. The plasticizer of the subject invention functions as a plasticizer during formation of the electrolytic cell precursor, and acts as an electrolyte solvent upon activation of the battery. A second electrolyte solvent carries the electrolyte salt to activate the electrolytic cell. The two electrolyte solvents form a binary solvent system within the electrolytic cell.

The subject invention encompasses a novel method of providing an electrolyte-solvent solution in a solid battery system. A first component of this binary electrolyte solvent system is provided by a material which has a dual function: the first solvent component acts as a plasticizer in the formation of a solid polymeric matrix (separator), or in the formation of an electrode which includes a solid polymeric matrix. Mter the solid polymeric matrix has been formed using the plasticizer functionality of the first solvent component, the first solvent component is maintained within the solid polymeric matrix. Individual sheets of materials comprising the electrodes and the interposed polymeric matrix can be laminated to form an electrolytic cell precursor. The electrolytic cell precursor does not include the electrolyte salt which is necessary to form a functional battery system.

The second component of the binary electrolyte solvent system is an electrolyte solvent, which carries the electrolyte salt into the electrolytic cell precursor. The first and second components of the binary electrolyte solvent system mix within the electrolytic cell, dispersing the electrolyte salt throughout the binary electrolyte solvent system. The addition of the electrolyte salt to the electrolytic cell precursor acts to activate the cell precursor, and to form a functional electrolytic cell or battery system.

In an alternate, less preferred embodiment, the first solvent includes at least some of the total electrolytic salt for the completed electrolytic cell. This is a less preferred embodiment, as lithium electrolyte salts are generally extremely reactive to moisture, and once the electrolytic salt has been incorporated into the electrolytic cell or electrolytic cell precursor, it must be maintained under strictly controlled conditions.

A solid battery precursor is prepared by forming electrodes (an anode and a cathode), and a polymeric electrolyte film (or other separator) which is laminated or sandwiched between the electrodes. At least one electrode or the polymeric electrolyte film of the subject invention includes a polymeric matrix and a plasticizer. The plasticizer acts as a first electrolyte solvent. An electrolyte solution, comprising a second electrolyte solvent and an electrolyte salt, is introduced into the battery precursor to activate the electrolyte cell. As the electrolyte solution is dispersed throughout the solid battery, the electrolyte salt is dispersed in the binary solvent comprising a mixture of the first electrolyte solvent and the second electrolyte solvent.

BRIEF DESCRIPTION OF THE DRAWING

The Figures are drawn for clarity and are not drawn to scale. Similar numbers refer to similar structures throughout the Figures.

DETAILED DESCRIPTION OF THE INVENTION

An electrochemical cell or battery of the subject invention has a negative electrode side, a positive electrode side, and a separator (preferably a polymeric electrolyte film) therebetween. A solid, secondary electrolytic cell of the subject invention includes an anode and a cathode, and, interposed functionally therebetween, an ion-conducting electrolyte. Generally in electrolytic cells of the subject invention, the ion-conducting electrolyte is permeated throughout the structures of each of the anode, the cathode, and the interposed separator or polymeric electrolyte film.

An electrochemical cell precursor is formed when the anode film, the separator (polymeric matrix film), and the cathode film are laminated together. Each of the anode film and the cathode film may include a current collector. The cell precursor is activated when an inorganic salt and an electrolyte solvent are placed within the porous portions of the cell precursor. Once the electrochemical cell has been activated, it is charged using an external energy source prior to use.

Figure 1:
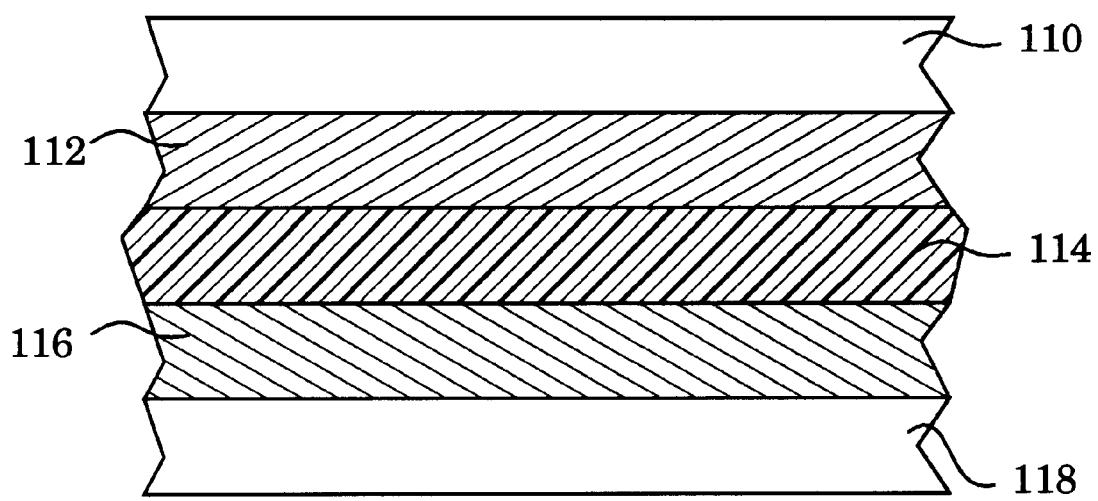
FIG. 1 shows a cross-sectional view of a typical battery of the prior art, including anode, cathode, solid electrolyte film, and current collectors.
Figure 2A:
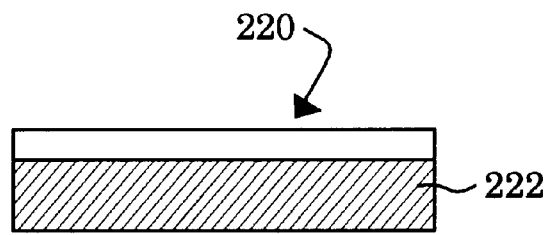
FIGS. 2a through 2c graphically represent the preparation of an electrolytic cell by the prior art extraction method.
Figure 2B:
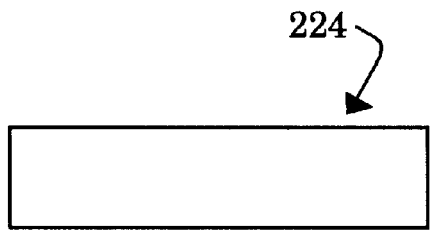
Figure 2C:
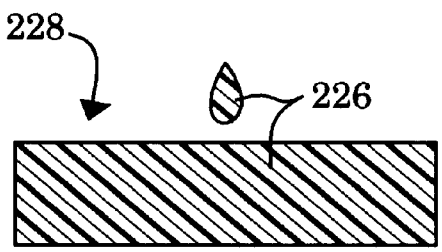
Figure 3A:
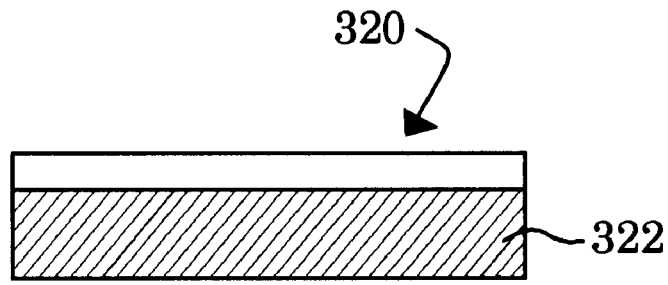
FIGS. 3a and 3b graphically represent the preparation of an electrolytic cell by the prior art displacement method.
Figure 3B:
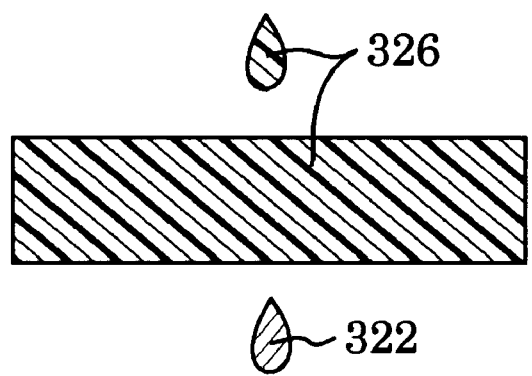
Figure 4A:
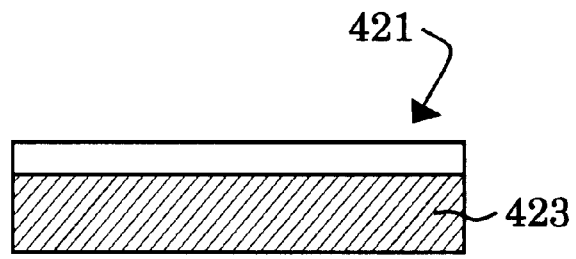
FIGS. 4a through 4c graphically represent the preparation of an electrolytic cell by the subject method.
Figure 4B:
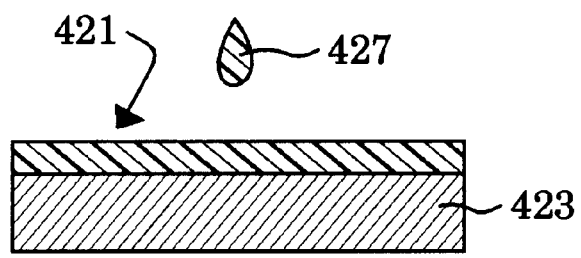
Figure 4C:
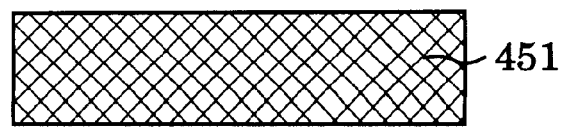

FIGS. 4a through 4c graphically represent the process of the subject invention. As shown in FIG. 4a, a large quantity of a homogeneously distributed plasticizer/first electrolyte solvent 423 is present in a polymeric matrix 421, which can be an electrolytic cell precursor, or can be a component which will be used in a battery, such as an anode, cathode, or electrolyte. For ease of representation and conceptualization, the plasticizer is shown graphically as residing in only a portion of the polymeric matrix. While this is conceptually accurate, the plasticizer/first electrolyte solvent 423 is actually homogeneously distributed throughout the polymeric matrix 421.

Rather than extracting or displacing the plasticizer 423, as discussed above with reference to the prior art, the plasticizer is maintained in situ both before and after solidification of the polymeric matrix 421. As shown in FIG. 4b, a second electrolyte solvent solution 427 is added to the polymeric matrix 421. This second electrolyte solvent solution 427 includes both an electrolyte salt and an electrolyte solvent. The electrolyte is preferably added in sufficient concentration that upon mixing of the first electrolyte solvent 423 and the second electrolyte solvent solution 427 (as shown in FIG. 4c), a binary electrolyte solution 451 having a desired concentration of each of the first electrolyte solvent, the second electrolyte solvent, and the electrolyte salt itself, is formed.

A battery of the subject invention refers to two or more electrochemical cells electrically interconnected in an appropriate series or parallel arrangement, to provide required operating voltage and current levels.

Separator/Solid Polymeric Matrix

A separator structure is commonly used to space the anode and the cathode apart from one another, while allowing free transmission of ions from one electrode to the other.

A separator structure may be formed from commercially available separators made of glass fiber, porous polypropylene or porous polyethylene. Such separators include Type A/E glass fiber filters (Gelman Sciences, Ann Arbor, Mich.), and Celgard (Hoechst-Celanese Corp., New York, N.Y.).

The separator is preferably a solid polymeric matrix, such as a polymeric electrolyte film. Suitable polymeric electrolyte film provide a porous structure, permeated with a plasticizer, upon curing or casting. Preferred polymeric electrolyte films are produced using a casting process in which a carrier liquid is removed to form a flexible sheet. An alternate preferred method produces polymeric electrolyte films by extrusion processes.

Suitable curable polymeric matrices are well known in the art, and include solid matrices formed from inorganic polymers, organic polymers, or a mixture of organic polymers with inorganic non-polymeric materials. A preferred solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference. Suitable non-polymeric inorganic materials for use in conjunction with the solid polymeric matrix include, by way of example, β-alumina, silver oxide, lithium oxide, and the like. Suitable inorganic monomers are also disclosed in U.S. Pat. Nos. 4,247,499; 4,388,385; 4,394,280; 4,432,891; 4,414,506; 4,539,276; 4,557,985; 4,925,751; and 4,990,413, each of which is incorporated herein by reference.

If the solid matrix forming material (monomer or partial polymer thereof) employed is cured by radiation polymerization to form a solid matrix, the plasticizer should be radiation inert at least up to the levels of radiation employed. If the solid matrix forming monomer or partial polymer is cured by thermal polymerization, then the plasticizer should be thermally inert at least up to the temperatures of thermal polymerization.

A preferred polymeric matrix is formed by a casting process in which no curing is necessary to form the solid matrix, e.g., using casting or extrusion processes. A preferred method employs a copolymer of polyvinylidene difluoride (PVdF) and hexafluoropropylene (HFP) dissolved in acetone or another suitable carrier liquid. Upon casting the solution, the carrier liquid is evaporated to form the polymeric separator film. The solution may be cast directly onto an electrode. Alternatively, the solution can be cast onto a substrate, such as a supporting web or solid surface. The solid matrix film is formed as the carrier liquid (e.g., acetone) is removed. The polymeric film can be removed from the surface upon which it was formed in order to facilitate lamination of the battery structure.

An especially preferred polymeric matrix provides a flexible, self-supporting film upon casting. It is formed from a copolymer of polyvinylidene difluoride (PVdF) and hexafluoropropylene (HFP). The copolymer comprises about 75 to 92% (by weight) of the vinylidene difluoride, and about 8 to 25% hexafluoropropylene. Preferably, the copolymer comprises about 80 to 90% of the vinylidene difluoride, and about 10 to 20% hexafluoropropylene. More preferably, the copolymer comprises about 85 to 90% of the vinylidene difluoride, and about 10 to 15% hexafluoropropylene. One especially preferred, commercially available copolymer material is KYNAR™ Flex 2801 (Elf Atochem North America, Philadelphia, Pa.), which provides an 88:12 ratio of PVdF: HFP.

Inorganic filler adjuncts, such as fumed alumina or fumed silica may be used as desired.

Plasticizer/First Electrolyte Solvent

Generally, plasticizers are organic solvents, with limited polymer solubility, that facilitate the formation of porous polymeric structures. Plasticizers which are appropriate for use herein are also good electrolyte solvents, as they are neither extracted nor displaced by a secondary solvent system, as was necessary in the prior art. Rather, it combines with the secondary electrolyte solvent to form a binary solvent system.

Appropriate plasticizers have high boiling points, typically in the range from about 100° C. to about 350° C. The plasticizer or plasticizer system must be compatible with the components of the electrochemical cell precursor, it must be processable within design parameters, it must exhibit low polymer solubility, and it must be an appropriate solvent for the electrolyte salt used.

A variety of materials can function as either a plasticizer or as an electrolyte solvent. Such materials include, for example, ethylene carbonate (EC), propylene carbonate (PC), butylene carbonate (BC), vinlyene carbonate (VC), diethyl carbonate (DEC), ethyl methyl carbonate (EMC), dipropylene carbonate (DPC), halogenated carbonates, acetates, glymes, and low molecular weight polymers such as polycarbonates, polyacrylates, or polyesters. Mixtures of such plasticizer/solvents can also be used.

It has been determined that a system comprising ethylene carbonate (EC) and propylene carbonate (PC) can be used as an effective plasticizer/first solvent. It has been discovered that these plasticizers, which also function as electrolyte solvents, need not be removed from electrolytic cell precursor elements prior to activation of the electrolytic cell precursor. Rather, when retained in place, this plasticizer/first solvent system can function as a component of a binary solvent system.

When an EC/PC plasticizer/first solvent system is used, the plasticizer preferably includes at least 40 wt % EC. Generally, the plasticizer includes from about 40 to about 90 wt % EC and from about 60 to about 10) wt % PC. More preferably, the plasticizer includes from about 50 to about 80 wt % EC and from about 50 to about 20 wt % PC. An especially preferred plasticizer/first solvent is 75 wt % ethylene carbonate and 25 wt % propylene carbonate.

It had been believed that when propylene carbonate based electrolytes were combined in an electrolytic cell with graphite, it was necessary to include a sequestering agent, such as a crown ether, in the electrolyte. It has been unexpectedly discovered that the binary solvent system of the subject invention can incorporate both propylene carbonate as a solvent and graphite within the same electrolytic cell without the use of sequestering agents.

Second Electrolyte Solvent

The second electrolyte solvent is a solvent included in the electrolyte solution for the purpose of solubilizing alkali salts during operation of the electrolytic cell. The second electrolyte solvent can be any compatible, relatively non-volatile, aprotic, relatively polar solvent. Preferably these materials have boiling points greater than about 85° C. to simplify manufacture and increase the shelf life of the electrolyte/battery. Typical examples of solvents are dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like, and mixtures of such materials. U.S. patent application, Ser. No. 08/630,402, which discloses such materials, is incorporated herein.

It has been determined that a plasticizer system comprising ethylene carbonate (EC) and dimethyl carbonate (DMC) can be used as an effective second solvent system.

When an EC/DMC second solvent system is used, the plasticizer preferably includes at least 40 wt % EC. Generally, the plasticizer includes from about 40) to about 90 wt % EC and from about 60 to about 10 wt % DMC. More preferably, the plasticizer includes from about 50 to about 80 wt % EC and from about 50 to about 20 wt % DMC. An especially preferred second solvent is two-thirds ethylene carbonate and one-third dimethyl carbonate, by weight.

Electrolyte Salt

Electrolyte salts are those inorganic salts which are suitable for use in a non-aqueous electrolyte. Particularly useful are alkali salts wherein the cation of the salt is an alkali selected from the group consisting of lithium, sodium, potassium, rubidium, silver, and cesium, and which are suitable for use in the solvent-containing electrolyte and in the composite electrodes of an electrolyte cell.

A variety of electrolyte salts are known to the art. For example, $LiPF_6$, LiSCN, $LiAsF_6$, $LiClO_4$, $LiN(CF_3SO_2)_2$, $LiBF_4$, $LiCF_3SO_3$, $LiSbF_6$, NaSCN, and the like. The electrolyte salt typically comprises from about 5 to about 25 weight percent of the inorganic ion salt based on the total weight of the binary electrolyte. Preferably, the salt is from about 10 to 20 weight percent. The weight percent of the salt depends on the type of salt and upon the specific binary electrolyte solvent employed.

Because the electrolyte salt is introduced in a single component of a binary system, the weight percentage of the salt must be loaded into the second solvent to reach the desired concentration based upon the presence of each of the first and second solvents employed in the binary system. For example, a binary solvent system can be used in which the first solvent (plasticizer) and the second solvent are present in a weight ratio of 1:1. The weight ratio of the salt would be determined by using the total weight of the binary plasticizer. However, the salt would be introduced only in the second solvent of the binary system.

For example, a 100 gram binary system using a 1:1 first solvent to second solvent ratio, with a 10% loading of the salt in the binary system, would use 50 grams of the first solvent as a plasticizer. 50 grams of the second solvent with 10 grams of the salt would provide the second electrolyte solution.

In contrast, a 100 gram binary system using a 3:1 first solvent to second solvent ratio, with a 10% loading of the salt in the binary system, would use 75 grams of the first solvent as a plasticizer. 25 grams of the second solvent with 10 grams of the salt would provide the second electrolyte solution.

Similarly, a 100 gram binary system using a 1:3 first solvent to second solvent ratio, with a 10% loading of the salt in the binary system, would use 25 grams of the first solvent as a plasticizer. 75 grams of the second solvent with 10 grams of the salt would provide the second electrolyte solution.

A preferred electrolyte salt is a lithium salt, $LiPF_6$, in a final concentration of approximately 8 to 15 wt % based upon the total weight of the binary electrolyte.

Negative Electrode

The negative electrode is the anode during discharge. Typical anode active materials are well known in the art, and include, by way of example, lithium; lithium alloys such as alloys of lithium with aluminum, mercury, manganese, iron, or zinc; intercalation based anodes such as those using carbon or tungsten oxides; and the like. Preferred anodes include lithium intercalation anodes employing carbon materials such as graphite, cokes, mesocarbons, and the like. The anode may also include an electron conducting material such as carbon black.

Carbon intercalation based anodes, such as those suitable for use in the subject invention, include a polymeric binder. That is, a solid polymeric matrix provides part of the structure of the anode. As with the polymeric electrolyte film/separator, the polymeric binder is formed using both a solid-polymer-forming material and a plasticizer compound. The polymeric binder is often a film-forming agent which, together with a plasticizer component, is suitable for forming a porous composite sheet for lamination. Polymeric binders which are useful for formation of the anode also find use as the polymeric electrolyte film, as described herein.

The anode commonly includes a current collector laminated with the negative electrode material. Preferably a copper foil sheet, open mesh, expanded metal, woven or non-woven or knitted wire fabric or grid is used. Materials suitable for anodic current collectors are known to the art, and are usually comprised of an electron conductive material such as metals or alloys. Typical materials include nickel, iron, stainless steel, or copper. Preferably, the current collector has a thickness from about 100 $\mu$m to about 250 $\mu$m, more preferably about 110 $\mu$m to about 200 $\mu$m, and most preferably about 125 $\mu$m to about 175 $\mu$m. Each current collector is also connected to a current collector tab which extends from the edge of the current collector. In batteries comprising multiple electrochemical cells, the anode tabs are preferably welded together and connected to a nickel lead. External loads can be electrically connected to the leads. Current collectors and tabs are described in U.S. Pat. Nos. 4,925,752; 5,011,501; and 5,326,653, each of which is incorporated herein.

An adhesion promoter can be used to facilitate bonding between the anode material and the anodic current collector.

The anodic electrode of the subject invention usually comprises an anode film laminated onto one or both sides of the anodic current collector. Typically, the anode film is from about 100 $\mu$m to about 250 $\mu$m thick. Preferably, each anode film is about 100 $\mu$m to about 200 $\mu$m, and more preferably about 125 $\mu$m to 175 $\mu$m, in thickness.

Positive Electrode

The positive electrode is the cathode during discharge. Typical cathode active materials are known to the art, and include insertion compounds, i.e., any material which functions as a positive pole in a solid electrolytic cell. For lithium ion applications, these are normally characterized as containing all the lithium for the cell. Preferable cathodic materials de-intercalate lithium at a high voltage when contrasted to lithium, making them stable in air. Typical cathodic materials include, by way of example, transition metal oxides, sulfides, and selenides. Such materials include oxides of cobalt, manganese, molybdenum, and vanadium; sulfides of titanium, molybdenum, and niobium; the various chromium oxides; copper oxides; and lithiated oxides of cobalt, manganese and nickel; and the like. Cathodic materials include $Li_xMn_2O_4$, $LiCoO_2$, $LiNiO_2$, $LiCo_{0.5}Ni_{0.5}O_2$, and the like.

In a preferred embodiment, the cathodic material is mixed with an electroconductive material such as graphite, powdered carbon, powdered nickel, metal particles, conductive polymers, and the like. The cathode is preferably produced using a polymeric binder to form the positive cathodic film, i.e., a solid polymeric matrix provides part of the structure of the cathode. As with the polymeric electrolyte film/ separator, the polymeric binder is formed using both a solid-polymer-forming material and a plasticizer compound. Polymeric binder materials also find use as the polymeric electrolyte film, as described herein.

A cathode generally includes a current collector laminated with a positive electrode active film material. Preferably an aluminum foil sheet, open mesh, expanded metal, woven or non-woven or knitted wire fabric or grid is used. Materials suitable for cathodic current collectors are known to the art, and are typically comprised of an electron conductive material such as metals or alloys. The cathode current collector is typically of aluminum, stainless steel, and such foils having a protective conductive coating foil. Preferably the cathode current collector is a sheet or grid of aluminum. Preferably, the current collector has a thickness from about 100 $\mu$m to about 250 $\mu$m, more preferably about 110 $\mu$m to about 200 $\mu$m, and most preferably about 125 $\mu$m to about 175 $\mu$m. Each current collector is also connected to a current collector tab which extends from the edge of the current collector. In batteries comprising multiple electrochemical cells, the cathode tabs are preferably welded together and connected to a lead. External loads can be electrically connected to the leads. Current collectors and tabs are described in U.S. Pat. Nos. 4,925,752; 5,011,501; and 5,326,653, each of which is incorporated herein.

An adhesion promoter can be used to facilitate bonding between the cathode material and the cathodic current collector.

The cathodic electrode of the subject invention usually comprises a cathode film laminated onto one or both sides of the cathodic current collector. Typically, the cathode film is from about 100 $\mu$m to about 200 $\mu$m thick. Preferably, each anode film is about 130 $\mu$m to about 175 $\mu$m, and more preferably about 140 $\mu$m to 165 $\mu$m, in thickness.

The specific carrier liquid for the electrode paste will vary with the desired process parameters. When the carrier liquid is removed by drying, the carrier liquid is preferably a volatile liquid which is chemically inert to the particulates suspended therein. Suitable carrier liquids are well known to the art, and include acetone, xylene, alcohols, and the like.

A method for preparing an electrolytic cell includes the steps of (a) preparing an electrolytic cell precursor which includes a solid polymeric matrix and a plasticizer which functions as a first electrolyte solvent; and (b) activating the electrolytic cell precursor. The electrolytic cell precursor is activated by introducing an electrolyte solution which includes a mixture of a second electrolyte solvent, and an electrolyte salt. The concentration of the electrolyte salt carried by the second solvent is greater than that which is desired in the completed electrolytic cell: plasticizer present in the cell acts as an electrolyte solvent, and dilutes the electrolyte salt. The electrolyte salt is diluted to a final concentration in a binary solvent mixture which includes both the first electrolyte solvent (the plasticizer) and the second electrolyte solvent.

Because many electrolyte salts are sensitive to moisture or other chemical compounds, the activation of the electrolytic cell precursor preferably takes place in an inert, moisture-free atmosphere, such as under an argon atmosphere. Electrolytic cells and cell precursors are preferably packaged for storage in moisture-impermeable packaging.

EXAMPLE 1

Cathode Current Collector

The cathode current collector employed is an etched aluminum grid, having a layer of adhesion promoter on the surface of the grid.

An aluminum grid used for the anode current collector was a sheet of expanded aluminum metal about 50 $\mu$m thick. It is available under the designation 2A105-077 (flattened and annealed) (Delker, Branford, Conn.).

The surface of the aluminum grid is prepared by etching the grid in a series of solutions. Specifically, the aluminum grid is placed into an acetone bath for 5 minutes. It is then rinsed in water for 1 to 2 minutes. The aluminum grid is then dipped in an etch bath solution comprising 28 grams of potassium hydroxide pellets which have been dissolved in 500 mL of methanol. The aluminum grid is removed from the etch solution after 8 minutes, and placed in a fresh water bath for 8 minutes, followed by an acetone bath for 3 minutes.

An adhesion promoter layer is prepared as a dispersed colloidal solution. A grid coating is formed by adding 100 parts (by weight) ethanol, 100 parts Morton Adcote 50C12, and 5 parts Super P™ into a ball mix jar, and mixed for one hour. The dispersed colloidal solution is diluted in 100 parts ethanol and spray coated onto the etched aluminum grid.

EXAMPLE 2

Porous Cathode Structure

A cathode slurry is prepared by preparing a binder solution, a plasticizer solution, a cathode active powder mixture, and blending the three mixtures together. After mixing, the slurry is cast onto glass to form a free-standing electrode film which is laminated onto the treated current collector of Example 1.

The binder solution is prepared by mixing 26.7 grams of KYNAR™ Flex 2801 (an 88:12 copolymer of polyvinylidene difluoride (PVdF) and hexafloropropylene (HPF)), into 333.3 grams of electronic grade acetone. The mixture is stirred for about 4 hours with a magnetic stir bar. The copolymer functions as the binder for the cathode active materials.

The plasticizer solution is prepared by dissolving 26.0 grams of ethylene carbonate into 26.0 grams of propylene carbonate. The solution is heated to approximately 45° C. and stirred with a magnetic stir bar for 4 hours to bring the ethylene carbonate into solution. The plasticizer gives the electrode structural stability during electrode formation and creates the porosity needed for electrolyte penetration when the cell is activated.

The cathode active powder mixture is prepared by adding 173.4 grams of $Li_xMn_2O_4$ (Kerr McGee, Silver Springs, Id.) to 14.7 grams of SUPER-P™ carbon black (M.M.M. Carbon, Willebrock, Belgium), into a milling jar and rotating for 4 hours on a "roller type" jar mill. A suitable jar mill is Model CZ-92240 (US Stoneware, Mahwah, N.J.). The $Li_xMn_2O_4$ acts as the lithium source for the battery while the carbon aids in electrical conduction.

The three mixtures (binder, plasticizer, and cathode active mixtures) are mixed in a high shear mixer to disperse the active powders and form a slurry. A suitable mixer is Model ME 100DLX (Ross, Haupppauge, N.Y.). The binder solution is first added to the Ross mixing pot, followed by the plasticizer solution. The mixer is turned on to a setting of 200 rpm. The active powder mixture is added to the mixing pot while the solution is stirring to disperse the powders. The slurry is then mixed at a setting of 700 rpm for 45 minutes to form a well-mixed slurry.

The slurry contains the following solids (in weight percent):

| Component | weight percent (w/w) |
|---|---|
| $Li_xMn_2O_4$ | 65.0% |
| Super P | 5.5% |
| KYNAR ™ 2801 | 10.0% |
| Ethylene Carbonate | 9.75% |
| Propylene Carbonate | 9.75% |
| Total | 100.0% |

The cathode slurry is cast onto glass and coated using a doctor blade set an a gap thickness of approximately 26 mil. As the acetone evaporates, a free-standing electrode film, approximately 7 mil thick is formed. Two cathode films of 24 $cm^2$ with a treated aluminum current collector sandwiched between are laminated with a hot roll laminator to form the cathode electrode.

EXAMPLE 3

Anode Current Collector

The anode current collector employed is an etched copper grid, having a layer of adhesion promoter on the surface of the grid.

A copper grid used for the anode current collector was a sheet of expanded copper metal about 50 μm thick. It is available under the designation 2Cu5-155 (flattened and annealed) (Delker, Branford, Conn.).

The surface of the copper grid is prepared by etching the grid in a series of solutions. Specifically, the copper grid is placed into an acetone bath for 5 minutes. It is then rinsed in water for 1 to 2 minutes. The copper grid is then dipped in an etch bath solution comprising 1 molar nitric acid (35 ml 70% nitric acid and 500 mL of water). The copper grid is removed from the etch solution after 5 minutes, and placed in a fresh water bath for 8 minutes, followed by an acetone bath for 3 minutes.

An adhesion promoter layer is prepared as described above, and spray coated onto the etched copper grid.

EXAMPLE 4

Porous Anode Structure

An anode slurry is prepared by preparing a binder solution, a plasticizer solution, an anode active powder mixture, and blending the three mixtures together. After mixing, the slurry is cast onto glass to form a free-standing electrode film which is laminated onto the treated current collector of Example 3.

The binder solution is prepared by mixing 34.0 grams of KYNAR™ Flex 2801 into 292.0 grams of electronic grade acetone. The mixture is stirred for about 4 hours with a magnetic stir bar. The copolymer functions as the binder for the anode active materials.

The plasticizer solution is prepared by dissolving 26.3 grams of ethylene carbonate into 26.3 grams of propylene carbonate. The solution is heated to approximately 45° C. and stirred with a magnetic stir bar for 4 hours to bring the ethylene carbonate into solution. The plasticizer gives the electrode structural stability during electrode formation and creates the porosity needed for electrolyte penetration when the cell is activated.

The anode active powder mixture is prepared by adding 116.4 grams of SFG-15™ graphite (Lonza G&T, Ltd., Sins, Switzerland) and 4.5 grams SUPER-P™ carbon black into a milling jar and rotating for 4 hours on a "roller type" jar mill. A suitable jar mill is US Stoneware Model CZ-92240. The graphite acts as the lithium sink for the battery source for the battery while the carbon aids in electrical conduction.

The three mixtures (binder, plasticizer, and cathode active mixtures) are mixed in a high shear mixer to disperse the active powders and form a slurry. A suitable mixer is Ross Model ME 100DLX. The binder solution is first added to the Ross mixing pot, followed by the plasticizer solution. The mixer is turned on to a setting of 200 rpm. The active powder mixture is added to the mixing pot while the solution is stirring to disperse the powders. The slurry is then mixed at a setting of 700 rpm for 45 minutes to form a well-mixed slurry.

The slurry contains the following solids (in weight percent):

| Component | weight percent (w/w) |
|---|---|
| SFG-15 ™ | 56.0% |
| Super P | 2.2% |
| KYNAR ® 2801 | 16.4% |
| Ethylene Carbonate | 12.7% |
| Propylene Carbonate | 12.7% |
| Total | 100.0% |

The cathode slurry is cast onto glass and coated using a doctor blade set an a gap thickness of approximately 26 mil. As the acetone evaporates, a free-standing electrode film, approximately 6 mil thick is formed. Two cathode films of 24 $cm^2$ with a treated copper current collector sandwiched between are laminated with a hot roll laminator to form the anode electrode.

EXAMPLE 5

Separator

A polymeric electrolyte film is formed by casting a polymeric slurry on a suitable substrate and allowing the slurry to cure.

13.5 grams of propylene carbonate, 13.5 grams of ethylene carbonate, 31.8 grams KYNAR™ Flex 2801, and 21.6 grams of silanized fumed $SiO_2$ in 264 grams of acetone is mixed, preferably under low-shear conditions. The mixture is cast on a suitable substrate or carrier web. The acetone is evaporated from the cast material to form the polymeric electrolyte film. The polymeric matrix sheet has a thickness of from 2 mil to 2.5 mil, and weighs from 0.21 grams to 0.24 grams per 29 $cm^2$.

The slurry contains the following solids (in approximate weight percent):

| Component | weight percent (w/w) |
|---|---|
| KYNAR ™ 2801 | 39.5% |
| Ethylene Carbonate | 16.8% |
| Propylene Carbonate | 16.8% |
| Fumed Silica | 26.9% |
| Total | 100% |

The ethylene carbonate and propylene carbonate act as plasticizers during the formation of the polymeric matrix sheet, and act as an electrolyte solvent upon activation of the battery.

EXAMPLE 6

Lamination of Electrolytic Cell Precursor

A solid electrochemical cell precursor is formed by first positioning a polymeric electrolyte film of Example 5 between a cathode of Example 2 and an anode of Example 4, and then fusing structures under moderate pressure and temperature (e.g., 130–140° C.).

EXAMPLE 7

Activation of Electrolytic Cell Precursor

A solid electrochemical cell precursor is prepared according to Example 6. An electrolyte solvent is prepared by combining 59.6 grams of ethylene carbonate and 29.4 grams of dimethyl carbonate. To the electrolyte solvent is added 11.0 grams of $LiPF_6$ to form second electrolyte solvent solution. The electrolyte solvent solution is added to the cell precursor of Example 6. The activated electrolytic cell is packaged under vacuum and/or using a pressurizing package.

EXAMPLE 8

Preparation of Electrolytic Cell Precursor

A solid electrochemical cell precursor is formed by first positioning a sheet of Type A/E Glass Fiber Filter (Gelman Sciences) between a cathode of Example 2 and an anode of Example 4, and pressure is applied to the structure by use of a clamp.

EXAMPLE 9

Activation of Electrolytic Cell Precursor

A solid electrochemical cell precursor is prepared according to Example 8. An electrolyte solvent is prepared by combining 59.6 grams of ethylene carbonate and 29.4 grams of dimethyl carbonate. To the electrolyte solvent is added 11.0 grams of $LiPF_6$ to form second electrolyte solvent solution. The electrolyte solvent solution is added to the cell precursor of Example 8. The activated electrolytic cell is packaged under vacuum and/or using a pressurizing package.

EXAMPLE 10

Experimental

A battery of Example 9 is charged and discharged.

Figure 5A:
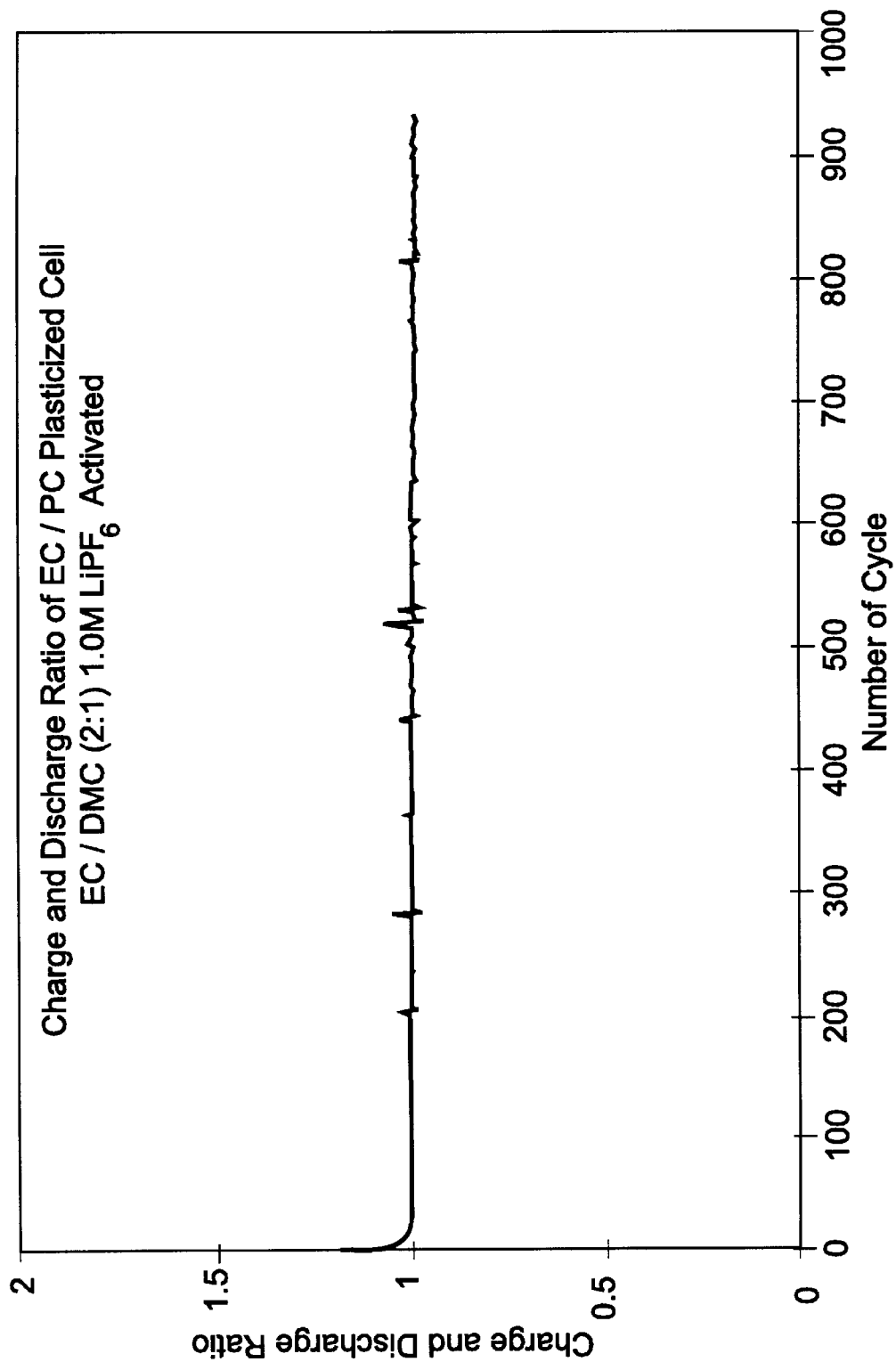
FIG. 5a shows the charge/discharge ratio vs. cycle number for an electrochemical cell of the subject invention.
Figure 5B:
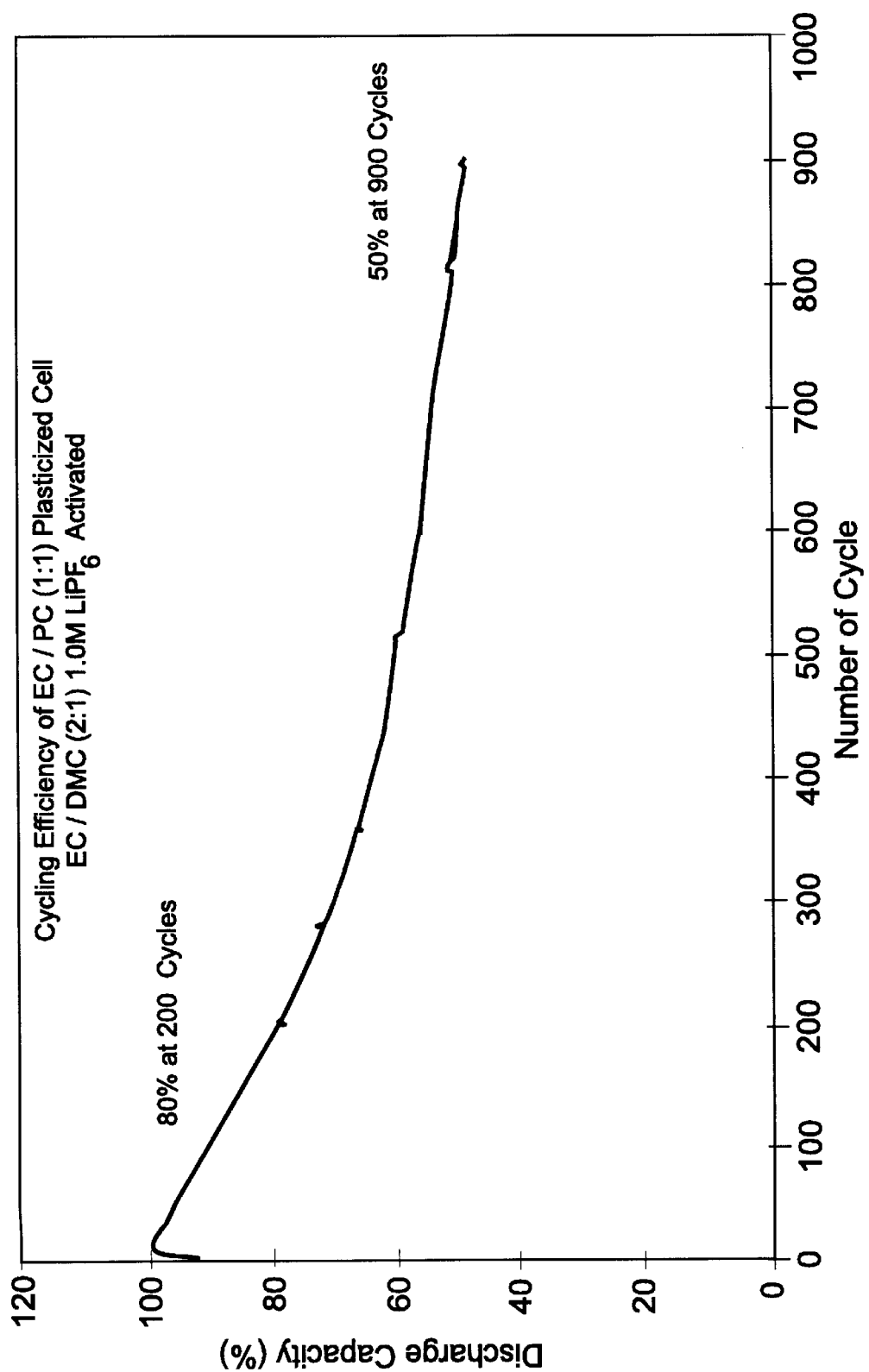
FIG. 5b shows the cycling efficiency vs. cycle number for an electrochemical cell of the subject invention.

FIG. 5a shows the charge/discharge ratio vs. cycle number for a cell of Example 9. The charge and discharge were at 1 $mA/cm^2$. At cycles 1 through 900, the charge/discharge ratio remains steady at approximately 1.0. FIG. 5b shows the cycling efficiency vs. cycle number for a cell of Example 9. At 200 cycles, the discharge capacity is approximately 80%. At 900 cycles, the discharge capacity is approximately 50% of the original discharge capacity.

EXAMPLE 11

Experimental

Figure 6:
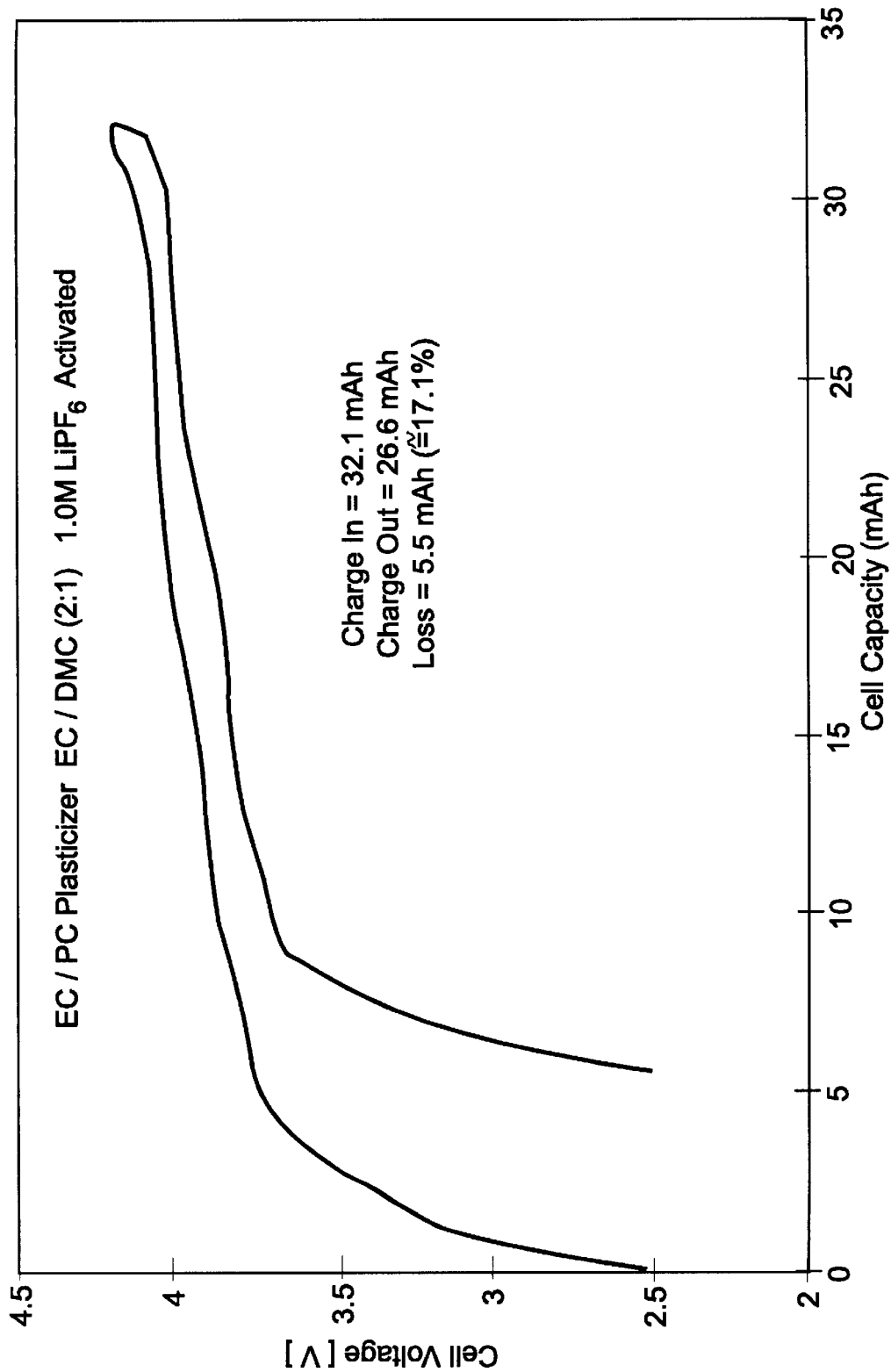
FIG. 6 displays the cumulative capacity vs. the cell voltage over a complete charge/discharge cycle for an electrochemical cell of the subject invention.
Figure 7:
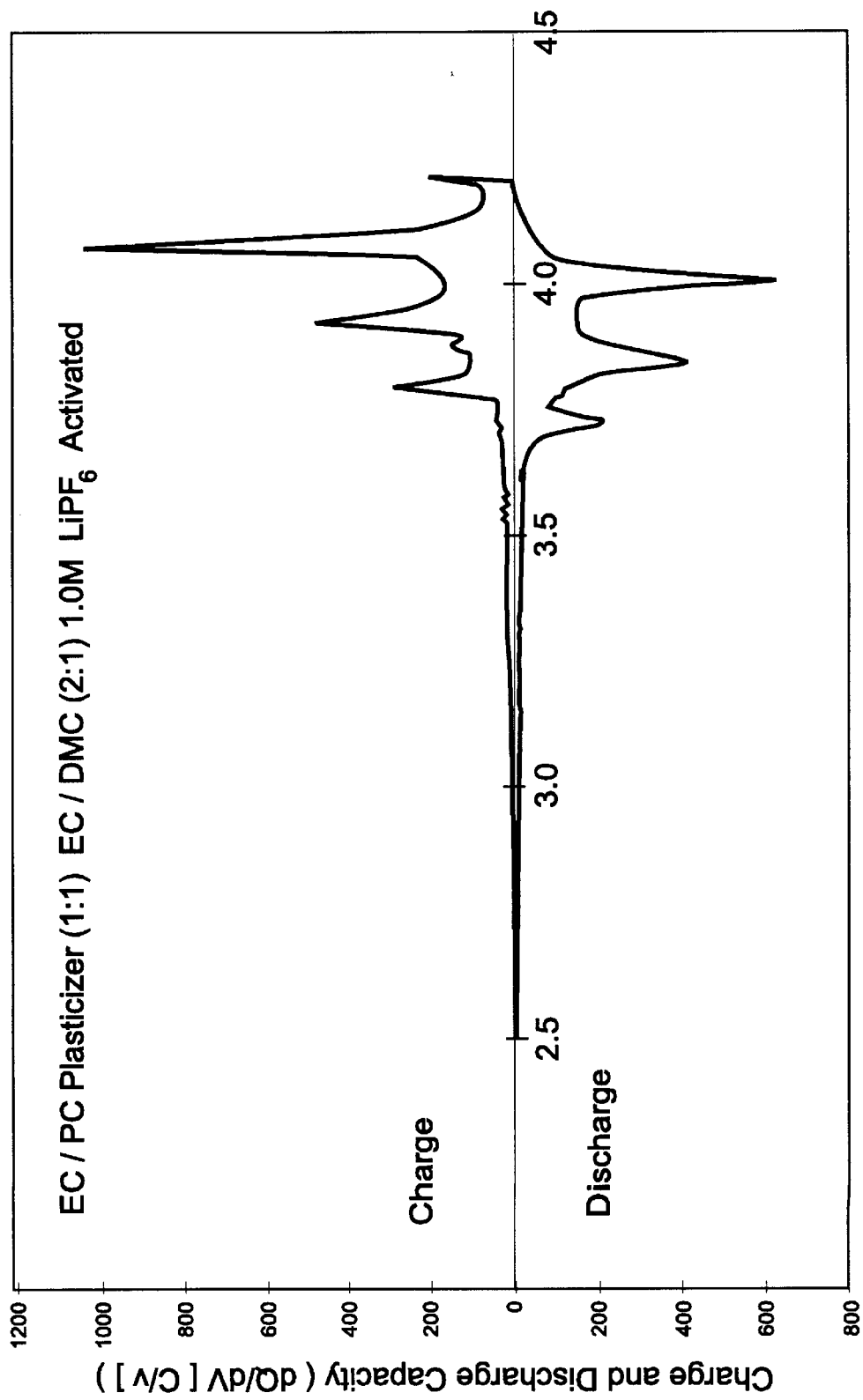
FIG. 7 displays the differential capacity during cell charge and discharge vs. cell voltage for an electrochemical cell of the subject invention.

A battery of Example 9 is charged and discharged. It is evaluated using the Electrochemical Voltage Spectroscopy (EVS), such as described in the article, "*Three Electrode Electrochemical Voltage Spectroscopy (TEVS): Evaluation of a Model Lithium Ion System*" (J. Barker, *Electrochimica Acta* 40(11):1603–1608, 1995). FIGS. 6 and 7 reflect data gathered from a single cycle of the same cell.

FIG. 6 depicts the EVS (Electrochemical Voltage Spectroscopy) voltage/capacity profile for a cell according to Example 9. The experimental parameters have a critical limiting current density of <0.32 $mA/cm^2$. The voltage limits are 2.5 to 4.2 volts.

The reversible capacity (coloumbic efficiency) for the cell of FIG. 6 was 83% of its initial capacity.

FIG. 7 shows the differential capacity during cell charge and discharge vs. cell voltage for the cell of FIG. 6. The symmetry displayed (graph above and below the x-axis) demonstrate an excellent electrochemical reversibility.

All materials percentages are weight/weight percent, unless noted otherwise. When a range of values is given to be "about" a certain percentage, each of the upper and lower ranges can be varied by 5 to 10 percent if such variation does not cause detrimental function to the system.

While the invention has been described in connection with several exemplary embodiments, it will be understood that many modifications will be apparent to those of ordinary skill in the art in light of the above disclosure. Reference to the following claims should be made to determine the scope of the claimed invention.

We claim:

1. A method for preparing an electrolytic cell component, said method comprising the steps of:
   (a) preparing an electrolytic cell component, said electrolytic cell component being selected from the group consisting of at least one of an anode, a separator film, and a cathode; said electrolytic cell component including a solid polymeric matrix and a plasticizer which functions as a first electrolyte solvent; said electrolytic cell component having said plasticizer neither solvent extracted nor displaced from the matrix by a secondary solvent system prior to or during step (b); and
   (b) activating said electrolytic cell component by introducing an electrolyte solution including a second electrolyte solvent and a first concentration of an electrolyte salt;

wherein said first concentration of electrolyte salt is diluted to a final concentration of electrolyte salt in a solvent mixture comprising said first electrolyte solvent and said second electrolyte solvent.

2. A method of claim 1 wherein said preparing step further comprises laminating together, sequentially, an anode, a polymeric electrolyte film, and a cathode, and wherein each of said anode, said polymeric electrolyte film, and said cathode includes a solid polymeric matrix and a plasticizer which functions as a first electrolyte solvent.

3. A method of claim 1 wherein said preparing step further comprises preparing a plasticizer which functions as a first electrolyte solvent including a mixture of ethylene carbonate and propylene carbonate.

4. A method of claim 3 wherein said preparing step further comprises preparing, as said plasticizer which functions as a first electrolyte solvent, a mixture which comprises at least about 40 wt % ethylene carbonate.

5. A method of claim 1 wherein said activating step further comprises using as said second electrolyte solvent a mixture including ethylene carbonate and dimethyl carbonate.

6. A method of claim 5 further comprising using a mixture which comprises at least about 40 wt % ethylene carbonate.

7. A method of claim 1 wherein said activating step further comprises preparing a second electrolyte solvent which includes from about 8 wt % to about 15 wt % of an electrolyte salt.

8. A method of claim 1 wherein said electrolytic cell component is prepared by solvent casting.

9. A method for preparing a component of an electrolytic cell, said component being defined by a polymeric matrix structure, said method comprising the ordered steps of:

(a) preparing an electrolytic cell component, said electrolytic cell component being selected from the group consisting of at least one of an anode, a separator film, and a cathode; said electrolytic cell component including a plasticizer which is introduced prior to forming the polymeric matrix defining said electrolytic cell component; said plasticizer not being removed by chemical extraction, said plasticizer acting as a first electrolyte solvent in said electrolytic cell component matrix; and (b) activating said plasticizer-containing electrolytic cell component by introducing an electrolyte solution including a second electrolyte solvent and a first concentration of an electrolyte salt;

wherein said first concentration of electrolyte salt is diluted to a final concentration of electrolyte salt in a solvent mixture comprising said plasticizer/first electrolyte solvent and said second electrolyte solvent.

10. A method of claim 9 wherein said preparing step further comprises laminating together, sequentially, an anode, a polymeric electrolyte film, and a cathode, and wherein each of said anode, said polymeric electrolyte film, and said cathode includes a solid polymeric matrix and a plasticizer which functions as a first electrolyte solvent.

11. A method of claim 9 wherein said preparing step further comprises preparing a plasticizer which functions as a first electrolyte solvent including a mixture of ethylene carbonate and propylene carbonate.

12. A method of claim 11 wherein said preparing step further comprises preparing, as said plasticizer which functions as a first electrolyte solvent, a mixture which comprises at least about 40 wt % ethylene carbonate.

13. A method of claim 9 wherein said activating step further comprises using as said second electrolyte solvent a mixture including ethylene carbonate and dimethyl carbonate.

14. A method of claim 13 further comprising using a mixture which comprises at least about 40 wt % ethylene carbonate.

15. A method of claim 9 wherein said activating step further comprises preparing a second electrolyte solvent which includes from about 8 wt % to about 15 wt % of an electrolyte salt.

16. A method of claim 9 wherein said electrolytic cell component is prepared by solvent casting.

* * * * *